(12) United States Patent
Di Benedetto et al.

(10) Patent No.: US 11,027,858 B2
(45) Date of Patent: Jun. 8, 2021

(54) LOCATION FOR UNMANNED AERIAL VEHICLE LANDING AND TAKING OFF

(71) Applicant: Drone Delivery Canada Corp., Vaughan (CA)

(72) Inventors: Paul Di Benedetto, Vaughan (CA); Gregory Colacitti, Vaughan (CA)

(73) Assignee: Drone Delivery Canada Corp., Vaughan (CA)

( * ) Notice: Subject to any disclaimer, the term of this patent is extended or adjusted under 35 U.S.C. 154(b) by 252 days.

(21) Appl. No.: 16/220,323

(22) Filed: Dec. 14, 2018

(65) Prior Publication Data
US 2019/0118973 A1  Apr. 25, 2019

Related U.S. Application Data

(62) Division of application No. 15/299,923, filed on Oct. 21, 2016, now Pat. No. 10,625,879.
(Continued)

(51) Int. Cl.
*B64C 39/00* (2006.01)
*B64C 39/06* (2006.01)
(Continued)

(52) U.S. Cl.
CPC .............. *B64F 1/00* (2013.01); *G06K 9/0063* (2013.01); *G06K 9/00771* (2013.01); *G06K 9/4671* (2013.01)

(58) Field of Classification Search
CPC ... B64C 39/00; B64C 39/024; B64C 2201/00; B64C 2201/027; B64C 2201/141;
(Continued)

(56) References Cited

U.S. PATENT DOCUMENTS 7,584,071 B2 * 9/2009 Lee .................... G01R 33/025
702/150
8,106,748 B2   1/2012 Lee
(Continued)

FOREIGN PATENT DOCUMENTS

DE   102014105583 A1   10/2015
DE   102014213023 A1   1/2016
(Continued)

OTHER PUBLICATIONS

Dronenet The next Big thing; Global Guerrillas, Wednesday, Jan. 2, 2013.
(Continued)

*Primary Examiner* — Yonel Beaulieu
(74) *Attorney, Agent, or Firm* — Bereskin & Parr LLP/S.E.N.C.R.L, S.R.L.

(57) ABSTRACT

An unmanned aerial vehicle (UAV) system, location and method, for operation with a flight management system, has a controlled access UAV zone for at least one of: UAV landing, UAV loading, and UAV take-off. A sensor can be in communication with a control panel and/or a lock to govern access to the UAV zone. The zone can have a barrier with closure secured by the lock, and controlled by a flight management system. Separate access codes can be provided for departure and destination locations, to enable personnel associated with a delivery request to access those locations, to effect delivery of an article. The codes can be generated and supplied when the flight management system receives a valid delivery request.

13 Claims, 4 Drawing Sheets

Related U.S. Application Data

(60) Provisional application No. 62/355,024, filed on Jun. 27, 2016.

(51) Int. Cl.

| | | |
|---|---|---|
| *B64D 1/00* | (2006.01) | |
| *B64D 1/02* | (2006.01) | |
| *B64D 1/08* | (2006.01) | |
| *B64F 1/00* | (2006.01) | |
| *G06K 9/00* | (2006.01) | |
| *G06K 9/46* | (2006.01) | |

(58) Field of Classification Search
CPC ....... B64C 2201/146; B64F 1/00; G06K 9/00; G06K 9/0063; G06K 9/00771; G06K 9/4671; E01F 3/00; B64D 1/00; B64D 1/02; B64D 1/08; G08G 5/006; G08G 5/0047; G08G 5/0065; G08G 5/0069; G08G 5/0073
See application file for complete search history.

(56) References Cited

U.S. PATENT DOCUMENTS

| | | | |
|---|---|---|---|
| 8,948,935 | B1 | 2/2015 | Peeters et al. |
| 9,051,043 | B1 | 6/2015 | Peeters et al. |
| 9,056,676 | B1 | 6/2015 | Wang |
| 9,120,568 | B2 | 9/2015 | Herman et al. |
| 9,174,733 | B1 | 11/2015 | Burgess et al. |
| 9,211,025 | B1 | 12/2015 | Elhawwashy |
| 9,244,147 | B1 | 1/2016 | Soundararajan et al. |
| 9,302,783 | B2 | 4/2016 | Wang |
| 9,305,280 | B1 | 4/2016 | Berg et al. |
| 9,334,052 | B2 | 5/2016 | Pasko et al. |
| 9,384,668 | B2 | 7/2016 | Raptopoulos et al. |
| 9,387,928 | B1 | 7/2016 | Gentry et al. |
| 9,429,953 | B1 | 8/2016 | Miller et al. |
| 9,527,605 | B1 | 12/2016 | Gentry et al. |
| 9,573,684 | B2 | 2/2017 | Kimchi et al. |
| 9,536,216 | B1 | 3/2017 | Lisso |
| 10,586,464 | B2* | 3/2020 | Dupray .............. H04B 7/18504 |
| 10,625,879 | B2* | 4/2020 | Di Benedetto ........... B64F 1/00 |
| 2005/0154653 | A1 | 7/2005 | Jongebloed |
| 2006/0249622 | A1 | 11/2006 | Steele |
| 2011/0063445 | A1 | 3/2011 | Chew |
| 2011/0264311 | A1 | 10/2011 | Lee et al. |
| 2012/0143482 | A1 | 6/2012 | Goossen et al. |
| 2014/0032034 | A1 | 1/2014 | Raptopoulos et al. |
| 2015/0120094 | A1 | 4/2015 | Kimchi et al. |
| 2015/0158587 | A1 | 6/2015 | Patrick et al. |
| 2015/0183528 | A1 | 7/2015 | Walsh et al. |
| 2015/0317597 | A1 | 11/2015 | Shucker et al. |
| 2015/0332206 | A1 | 11/2015 | Trew et al. |
| 2015/0336669 | A1 | 11/2015 | Kantor et al. |
| 2015/0339933 | A1 | 11/2015 | Batla et al. |
| 2015/0353195 | A1 | 12/2015 | Peeters et al. |
| 2015/0370251 | A1 | 12/2015 | Siegel et al. |
| 2015/0379874 | A1 | 12/2015 | Ubhi et al. |
| 2016/0001883 | A1 | 1/2016 | Sanz et al. |
| 2016/0009413 | A1 | 1/2016 | Lee et al. |
| 2016/0016664 | A1 | 1/2016 | Basuni |
| 2016/0033966 | A1 | 2/2016 | Farris et al. |
| 2016/0159496 | A1 | 6/2016 | O'Toole |
| 2016/0163204 | A1 | 6/2016 | Raptopoulos et al. |
| 2016/0200438 | A1* | 7/2016 | Bokeno .................. B60L 53/53 244/2 |
| 2016/0284221 | A1* | 9/2016 | Hinkle ................. G08G 5/0069 |
| 2017/0069214 | A1* | 3/2017 | Dupray ................ G08G 5/0013 |
| 2017/0073085 | A1* | 3/2017 | Tremblay ................ B64F 1/362 |
| 2017/0175413 | A1* | 6/2017 | Curlander ............... E04H 14/00 |
| 2017/0313421 | A1* | 11/2017 | Gil ............................ B64F 1/22 |
| 2018/0244404 | A1* | 8/2018 | Park ........................ B64F 1/007 |
| 2020/0265726 | A1* | 8/2020 | Dupray ................ G08G 5/0021 |

FOREIGN PATENT DOCUMENTS

| | | | |
|---|---|---|---|
| KR | 1020140115024 | A | 9/2014 |
| WO | 0218729 | A1 | 3/2002 |
| WO | 2015061008 | A1 | 4/2015 |
| WO | 2015175242 | A1 | 11/2015 |
| WO | 2015168573 | A1 | 2/2016 |
| WO | 2016019242 | A1 | 2/2016 |
| WO | 2016037219 | A1 | 3/2016 |
| WO | 2016059555 | A1 | 4/2016 |
| WO | 2016094067 | A1 | 6/2016 |

OTHER PUBLICATIONS

International Search and Written Opinion related to corresponding PCT Application No. PCT/CA2017/050777, dated Oct. 3, 2017.

* cited by examiner

LOCATION FOR UNMANNED AERIAL VEHICLE LANDING AND TAKING OFF

RELATED APPLICATION

This application is a division of U.S. application Ser. No. 15/299,923 filed Oct. 21, 2016, issued as U.S. Pat. No. 10,625,879 (issue date: Apr. 21, 2020), which claims the benefit of U.S. Provisional Application No. 62/355,024, filed on Jun. 27, 2016; the entire content of these applications is herein incorporated by reference.

FIELD

The present disclosure relates to unmanned aerial vehicles, and locations or facilities for unmanned vehicles.

INTRODUCTION

The following paragraphs are not an admission that anything discussed in them is prior art or part of the knowledge of persons skilled in the art.

Unmanned aerial vehicles (UAVs) have been coming into prominence and have been implemented in limited situations. One obstacle to expanding the uses of UAVs may be public safety. UAVs have also been proposed for delivering of articles, but there is no practical proposal for delivery of articles for customers or users who have little knowledge or familiarity with UAVs.

Know proposals for using UAVs can be found in U.S. Pat. Nos. 9,174,733 and 9,244,147; and U.S. Publication Nos. 201201453482, 20140032034 and 20150120094, the contents of all of which are incorporated by reference.

SUMMARY

The following is intended to introduce the reader to the detailed description that follows and not to define or limit the claimed subject matter.

In accordance with a first aspect of the disclosure, there is provided an unmanned aerial vehicle (UAV) system for operation with a flight management system, comprising:
 a control panel;
 a controlled access UAV zone for at least one of: UAV landing, UAV loading, and UAV take-off; and
 at least a first sensor in communication with the control panel;
 the control panel being operable to govern access to the UAV zone in response to at least one signal from the first sensor.

The UAV zone may have a barrier with an opening and a gate for the opening and at least one remotely operable lock for the gate, the lock being connected to at least one of the control panel and the flight management system.

The control panel may be operable to store an access code for the UAV zone; and the control panel may be operable to communicate with the flight management system and receive updates to the access code from the flight management system.

The first sensor may be operable to detect the presence of an obstruction within the UAV zone, and the control panel may be operable to restrict access to the UAV zone upon detection of an obstruction therein by the first sensor. The first sensor may be operable with the control panel to determine the obstruction as being one of: a) at least one animate object, b) at least one inanimate object; and c) a combination of at least one animate object and at least one inanimate object.

The control panel may be operable with the flight management system to halt all UAV landings and take-offs to and from the UAV zone upon detection of the obstruction.

The UAV system can include at least one of a motion detection sensor and a video surveillance apparatus connected to at least one of the control panel and the flight management system for control of the gate; wherein the flight management system is operable to override operation of the lock.

The UAV zone may include a cleaner operable to remove at least one type out of a group of possible types of the obstruction from the UAV zone, the group comprising: (a) at least one animate object; (b) at least one inanimate object; and (c) at least one animate object in combination with at least one inanimate object; and the control panel is operable to start the cleaner in response to receiving a signal indicating that the UAV zone has an obstruction of type a), and the UAV zone is free from UAV landings and take-offs.

The cleaner may be an air blower mounted within the UAV zone and/or a robot movable within the UAV zone.

A further aspect of the present disclosure provides a location for an unmanned aerial vehicle (UAV), the location comprising:
 an enclosure defining at least one zone for UAV landing and UAV take-off;
 a barrier around the zone to prevent access to the zone;
 an opening in the barrier;
 a closure for the opening, to permit access to the location; and
 a lock for the closure that can be controlled remotely.

The lock may be an electrically actuated lock, and a plurality of electrically actuated locks can be provided for redundancy. Further, a control panel may be connected to each lock for control thereof, with the control panel optionally including a display and a key pad for entering an access code, or being adapted to receive an access code through a wired or wireless connection.

The control panel may include at least one of a weather proof case and the display may be operable to show status and alarm information pertaining to at least one of: a) the location, and b) at least one UAV scheduled to interact with the location.

The control panel may include a connection to a flight management system for a UAV. The connection to the flight management system can be provided by at least one of a wireless internet connection, a satellite connection, a cellular connection, and a landline.

Multiple sensors can be provided on the closure, to detect if the closure is open or closed, and only permitting operation of a UAV within the enclosure when the closure is closed.

The location may include a solar panel connected with battery storage, the solar panel and storage being connected to the control panel to provide a primary power source. The location may include at least one of video surveillance and a motion detector for detecting motion within the enclosure, which can include at least one of an audible alarm and warning lights.

The lights may comprise one of:
 (i) a red warning light to indicate that the closure is secured and access is prohibited;

(ii) a red warning light to indicate that the closure is secured and access is prohibited and a green light to indicate that access is available and that the lock may be opened with an access code; and (iii) a series of colored lights to indicate status, including a red light to indicate that the closure is secured the zone for UAV landing must not be entered, a green light to indicate that access is available and that the lock may be opened with an access code, and a yellow light to indicate that there is an incoming UAV and the zone for UAV landing should not be entered.

The location may include a weight sensor for determining a gross weight of a UAV, the weight sensor being connected to at least one of the control panel and a flight management system.

The location may have, as the zone for UAV landing, a landing zone, and a heater for the landing zone, and also may include a blower for displacing unwanted debris from the zone for UAV landing.

The location may include one or more sensors for detecting hazardous materials. The one or more sensors may be positioned at the zone for UAV landing, and arranged to detect hazardous materials that are loaded on the UAV. The one or more sensors may be connected to at least one of the control panel and a flight management system.

The location may include a connection to a backup power supply.

The barrier may comprise a fence and the closure may comprise a gate in the fence, and the barrier optionally may comprise a wall.

A further aspect of the disclosure provides a UAV location management method for use with a flight management system, comprising:

providing a secure access unmanned aerial vehicle (UAV) location;
providing a cleaner for the location; and
monitoring for an obstruction in the UAV location;
when an obstruction is present in the UAV location:
(i) restricting access to the UAV location;
(ii) transmitting an instruction to the flight management system to halt UAV flights and take-offs to and from the UAV location; and
(iii) transmitting an instruction to the cleaner to clear the obstruction from the UAV location.

The method may further include:
determining that the obstruction is one of:
a) at least one animate object,
b) at least one inanimate object, and
c) at least one animate object in combination with at least one inanimate object; and
when the obstruction is determined to be at least one inanimate object, performing at least one of the steps (i) to (iii).

The method may provide at least one of an audible and visual notification at the UAV location when an obstruction is present in the UAV location, and also at least one of an audio and visual notification of each UAV landing and take-off.

The method may further comprise:
providing at least a first weight-sensitive UAV pad for at least UAV take-offs; and
by using at least one computing system:
assigning a gross weight limit to each UAV scheduled to take-off from the UAV pad, the limit being based on a safety factor and at least one of:
a) a characteristic of the UAV,
b) a characteristic of a power source of the UAV,
c) a scheduled flight path for the UAV, and
d) a weather condition;
monitoring the weight of the UAV when the UAV is positioned on the UAV pad; and
transmitting a halt-flight signal to the flight management system for the UAV where the weight exceeds the limit.

A first UAV-readable identifier can be provided for the first UAV pad, the identifier identifying at least one of: (a) a location of the UAV pad; and (b) an identity of the UAV pad.

At least a second UAV pad can be provided for at least UAV take-offs, and providing a second UAV-readable identifier for the second UAV pad, the second identifier being UAV-distinguishable from the first identifier.

The method may further comprise, by using at least one computing system:
providing a video feed showing the UAV location;
at least when an obstruction in the location is detected, rendering the feed available on at least one channel to be accessed by at least one of:
a) an operator of the flight management system, and
b) an operator of the UAV zone; and
providing at least one channel for receiving, from at least one of the operators, an override to at least one of the steps of:
a) restricting access to the UAV location, and
b) transmitting an instruction to the flight management system to halt UAV flights and take-offs.

The method may further comprise, by using at least one computing system:
controlling ground access to the UAV location by requesting entry of a ground access code upon receiving a request for the ground access to the location;
receiving a reference code from the flight management system;
comparing the ground access code with the reference code;
denying the ground access where the ground access code does not match the reference code; and
granting the ground access where the ground access code matches the reference code.

At least one of a land line or hard wired connection, an internet connection, a cellular connection, a wifi connection and a satellite connection may be included for the flight management system to access the at least one channel.

A further aspect of the disclosure provides a method of managing an unmanned aerial vehicle (UAV) landing and take-off location, the method comprising the steps of:
providing an enclosure defined by a barrier, the enclosure including at least one zone for landing and at least one zone for take-off of a UAV;
providing an opening in the barrier and a closure for closing the opening; and
providing a remotely actuatable lock for the closure.

A control panel can be connected to the lock, and can enable a user to input an access code to the control panel to open the lock. At least one of visual or audible notification of a status of the enclosure can be provided. The lock can be connected to a flight management system, operable via the connection to actuate the lock.

A weight sensor can be provided on at least one UAV take-off zone, the weight sensor being connected to the flight management system. The method may also include: verifying that the weight of a UAV is within a defined limit; and only permitting take-off of a UAV, the UAV having a weight, if the weight of the UAV is below a defined limit.

The method may also include: before arrival of a UAV, closing the closure and providing at least one of a visual and audible alarm that a UAV will be landing; and providing an all-clear signal to the flight management system indicating that the enclosure is secure and that the UAV may land on the landing zone.

At least one of a motion detector and a video surveillance apparatus for the enclosure can be provided; and the method then includes checking the motion detector and the video surveillance apparatus to determine that the landing zone is clear, before providing the all-clear signal to the flight management system.

BRIEF DESCRIPTION OF THE FIGURES

For a better understanding of the described embodiments and to show more clearly how they may be carried into effect, reference will now be made, by way of example, to the accompanying drawings in which.

DETAILED DESCRIPTION

Various systems, apparatuses or methods will be described below to provide an example of an embodiment of each claimed invention. No embodiment described below limits any claimed invention and any claimed invention may cover apparatuses and methods that differ from those described below. The claimed inventions are not limited to systems, apparatuses and methods having all of the features of any one apparatus or method described below, or to features common to multiple or all of the systems, apparatuses or methods described below. It is possible that a system, apparatus or method described below is not an embodiment of any claimed invention. Any invention disclosed in a system, apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Various embodiments of a location 100 for unmanned aerial vehicle (UAV) 102 landing and taking off are described below.

Figure 1:
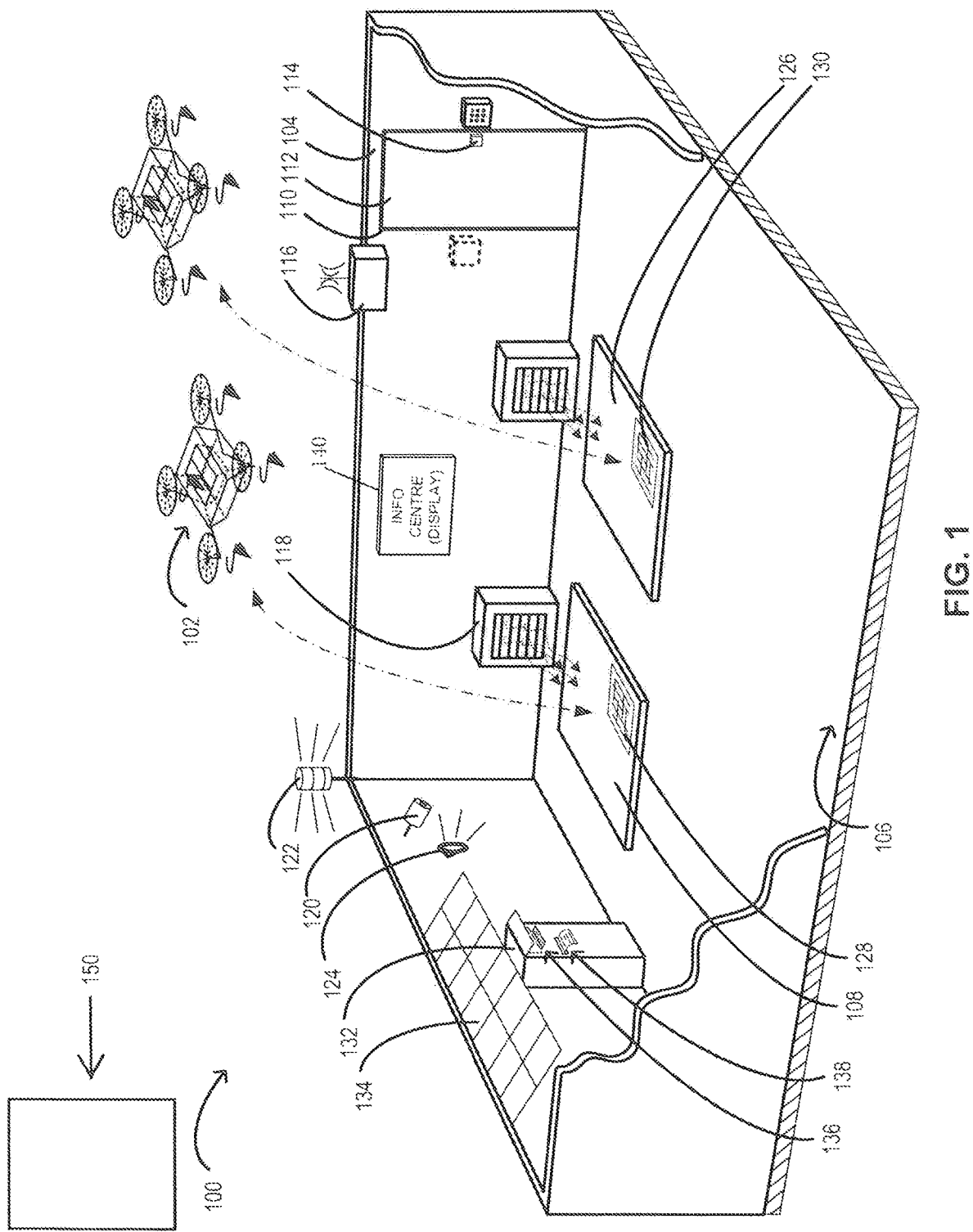
FIG. 1 is a schematic of an example location for unmanned aerial vehicle (UAV) landing and taking off, according to one embodiment.

Reference is now made to FIG. 1, which shows an example location for a UAV 102 landing and taking off. The location 100 has an enclosure 106, a barrier 104 around the enclosure 106, at least one of a landing zone 108, 126 and a take-off zone 108, 126 in the enclosure 106, an opening 110 in the barrier 104, a closure 112 for the opening 110, a control panel 116, a flight management system 150, and at least one remotely operable lock 114 for the enclosure 106. The control panel 116 may be operable to provide for restricting access and granting access to the location 100. As shown, the lock 114 may be connected to at least one of the control panel 116 and the flight management system 150, e.g. wirelessly. In one example, the closure 112 may be provided as a gate 112 operable to selectively provide and restrict ground access to the location 100 via the opening 110.

While a control panel 116 is shown separately from the lock 114, they could be combined in one device. Where there are a plurality of locks, each could have the necessary functionality of the control panel to communicate with the flight management system, or one lock could be a 'master lock' with this functionality, and other locks could be 'slave locks' controlled by the master lock. In this case, a separate communication device(s) can be provided for communications with user, which can include a touchscreen, visual indication of status of locks, etc.

Each of the zones 108, 126 may be identified as being for only one of landing and taking off, or may be designated for both landing and taking off. For a zone designated or used only for taking off an identifier may not be so critical, but is preferred as it enables the UAV to read the identifier and ensure it is departing from the correct location.

The barrier 104 and the gate or closure 112 can be provided in the form of a wire mesh fence with a gate also formed of wire mesh on a frame, for example. The height of the barrier 104 and fence 112 can be in the range of 6 to 8 feet (or approx. 1.85 to 2.45 metres). The barrier may alternatively be in the form of a wall. Additionally, while the location 100 is shown with a vertical enclosure open at the top, for UAVs to enter and exit vertically, other configurations are possible, particularly for winged UAVs that require horizontal landing and take-off facilities. The location 100 could be provided with a covering or roof partially or completely covering the location 100. At least for a full cover over the location 100, part of the cover will be movable to open the location to access by UAVs. The use of a cover or roof may have advantages in climates subject to snow or other precipitation harmful to UAVs. Further, as even rotor powered UAVs can land and take-off essentially horizontally, the location 100 may have a complete and fixed roof or cover, with the UAVs entering and leaving the zone from one side. (Although, for rotor driven UAVs, the immediate motion on arriving and leaving a landing or take-off zone may be vertical, this need only be for a small distance.) In this case an open side may include doors or gates to close off the location 100. This may particularly applicable, when the location can be provided on top of a building. In this case the open side of the location 100 may be provided continuous with a side wall of the building, so that even when open, it does not provide an access opening to unauthorized personnel.

In one aspect, the control panel 116 may be operable to store an access code for the location 100, and to receive updates to the access code from the flight management system 150. In another aspect, the control panel 116 may be operable to store additional access codes for the location 100. For example, additional access codes may be programmable into the control panel 116 via at least one of an input-output device connected to the control panel 116 The control panel may be configured for communication with user handheld or mobile devices, such as smartphones and tablet computers, and for this purpose user handheld devices may have a mobile app adapted to communicate with the control panel 116 and/or the lock 114.

At least one of the control panel 116 and the flight management system 150 may be operable to assign various access levels to the additional access codes. In some examples, the access levels may include restrictions on access times, times of day during which a given code may be used, and locations 100 to which the codes may grant access. In other examples, the access levels may also include one or more safety interlocks with various conditions for a given location 100. For example, a particular access code may be programmed to provide ground access to the location 100 irrespective of whether a condition (such as, for example, an obstruction) at the location 100, which condition may suspend other access codes, exists. Such an access code would be assigned to a person in a supervisory role, responsible for the maintenance of the location 100.

In another aspect, the location 100 may include a first sensor operable to detect an obstruction within the location. The control panel 116 may be operable to restrict access to the location upon detection of an obstruction to the location by the first sensor. In one example, the first sensor may include a video sensor 120 or a video surveillance apparatus 120. In another example, the first sensor may include a video sensor 120 operable with at least one processor executing instructions stored on a non-transitory memory to detect an obstruction. In yet other examples, the location 100 may include a second sensor operable with the first sensor to detect an obstruction. In one example, the second sensor may include an infrared sensor. In a particular example, the first sensor may be operable to detect a quantity of obstructions, and the second sensor may be operable to detect, for each obstruction, a type of the obstruction. Other possible sensors are thermal sensors and photo-electric sensors, where interruption of a laser beam on light beam indicates the presence of an unwanted object.

In some embodiments, the first sensor may be operable with at least one processor to detect at least one of an animate object and an inanimate object. In some embodiments, the first sensor may be operable with the second sensor to detect at least one of an animate object and an inanimate object. Such objects may be obstructions to the location 100 in that they may pose a risk to UAV 102 landings and take-offs, depending on the nature of the object(s). The control panel 116 may be operable with the flight management system 150 to halt all UAV landings and take-offs to and from the location 100 upon the detection of an obstruction. Examples of inanimate objects that may be obstructions may include: leaves, tree branches, and articles of garbage which may be, for example, blown into a given location 100 by a wind. Examples of animate objects that may be obstructions may include: persons and animals.

In one example, the control panel 116 may be operable to determine the obstruction to be one of: at least one animate object, at least one inanimate object, and at least one animate object in combination with at least one inanimate object. In other examples, at least one of the control panel 116 and the flight management system 150 may be operable to perform the determination. For example, the control panel 116 may be operable with the first sensor to distinguish between animate and inanimate projects, and in at least some embodiments to also distinguish whether the one type, the other type, or both types of objects are present within the location 100.

Obstructions such as animate and inanimate objects may pose a risk to UAV 102 landings and take-offs. UAV 102 landings and take-offs may pose a risk, such as a risk of injury or death, to the animate objects. In some examples, animate objects may be removed from the location 100 by providing, for example, at least one of an audio 124 and a visual 122 signal to the animate objects. In one example, a given color of light signal may be provided along with, for example, a buzzer. In one example, the light signal may be provided by at least one light source 122. The at least one light source 122 may be mounted on, for example, the enclosure 106. In other examples, a siren 124 may be provided to generate a sound at the location 100. In an aspect, a siren 124 may be operable to scare off animals from the location 100.

To discourage animals, and insects from entering or staying in the location, the location can be provided with a high frequency sound source, at a frequency that is inaudible to humans. This can be run continuously, or before and during a UAV take-off and landing, as required.

In some embodiments, the location 100 may include a cleaner 118 operable to remove at least inanimate objects from the location 100. Depending on the embodiment of the cleaner 118 selected for a particular embodiment of the location 100, it may be safe to operate the cleaner 118 even when an animate object is present within the location 100. One such example cleaner 118 may include an automated vacuum robot movable within the location 100 and equipped with collision and location sensors operable to allow the robot to avoid collisions and to operate within the location 100. In some cases, the cleaner 118 may be programmable to operate in designated parts of the location 100.

The parts may be designated by, for example, at least one combination of an infrared light source and a corresponding infrared sensor. The infrared light and sensor combination may be operable with at least the control panel to detect when the cleaner 118 interrupts a line of "sight" between the source and sensor, and in response send a signal to the cleaner 118 to change at least one operating characteristic of the cleaner 118. In one example, the characteristic may include a direction of motion of the cleaner 118.

A suitable cleaner 118 may be selected based on a given embodiment of the location 100. The cleaner 118 may be selected to be suitable for removing the types of obstructions that may be expected to occur at the given location 100. In one example, the cleaner 118 may be an air blower 118 disposed within the location 100. The blower 118 may be operable to generate and direct an air stream to the location 100 to remove at least one type of obstruction from the location 100.

Depending on the features of a given embodiment of the location 100 and the at least one UAV 102 used with the location 100, operating the cleaner 118 may pose a risk to at least one of the at least one UAV 102 and animate objects that may be present within the location 100 at various times. In other examples, operating the cleaner 118 may cause discomfort to the animate objects. Accordingly, the control panel 116 may be operable to start the cleaner 118 when the location 100 is free from UAV 102 landings and take-offs and the obstruction is determined to be at least one inanimate object In another aspect, the control panel 116 may be operable to: a) provide at least one warning signal, such as for example described above, when at least one animate obstruction and at least one inanimate obstruction is detected; b) monitor the animate obstruction; and c) start the cleaner 118 after the control panel receives an indication (for example, a signal) that the location 100 is free from animate obstructions and contains at least one inanimate obstruction. In yet other examples, the control panel 116 may be operable to generate a signal to halt all UAV landings and take-offs scheduled for the location 100, then start the cleaner 118, and then generate a signal to resume UAV landings and take-offs once it is determined that the location 100 is free from obstructions.

Depending on the use of a given embodiment of the location 100, it may be desirable to record at least one form of proof of UAV 102 landings and take-offs. In more particular examples, it may be desirable to record at least one form of proof of safe UAV 102 landings and take-offs. In some examples, the location 100 may include at least one sensor operable with at least one of a computing system and a processor to detect at least one of an approach, landing, and take-off of the at least one UAV 102 and to record a video of the at least one approach, landing, and take-off.

A UAV location management method for use with a flight management system is described next. In another aspect, a method of managing an unmanned aerial vehicle (UAV) landing and take-off location is also described.

The method may include providing a location 100 for at least one of UAV 102 landing and taking off, providing a cleaner 118 for the location 100, and by using at least one computing system: a) monitoring for at least one obstruction to the location 100; and b) determining the at least one obstruction as being one of: at least one animate object, at least one inanimate object, and at least one animate object in combination with at least one inanimate object.

The method may further include, when the obstruction is determined to be at least one inanimate object, performing at least one of: a) restricting access to the location 100; b) transmitting an instruction to the flight management system 150 to halt UAV 102 flights and take-offs to and from the location 100; and c) transmitting an instruction to the cleaner 118 to remove the inanimate object from the location 100.

In another aspect, the method may also include providing at least one of an audible 124 and a visual 122 notification at the location 100 when an obstruction is detected. In another aspect, the method may also include providing at least one of an audio 122 and visual 124 notification of each UAV 102 landing and take-off.

Additionally both before and during landing and take-off, the audible and visual notification devices 122, 124 can be operated to deter animals, etc. Also, as a standard part of any UAV landing or take-off, blowers and other cleaning devices can be operate before the landing or take-off.

Figure 4:
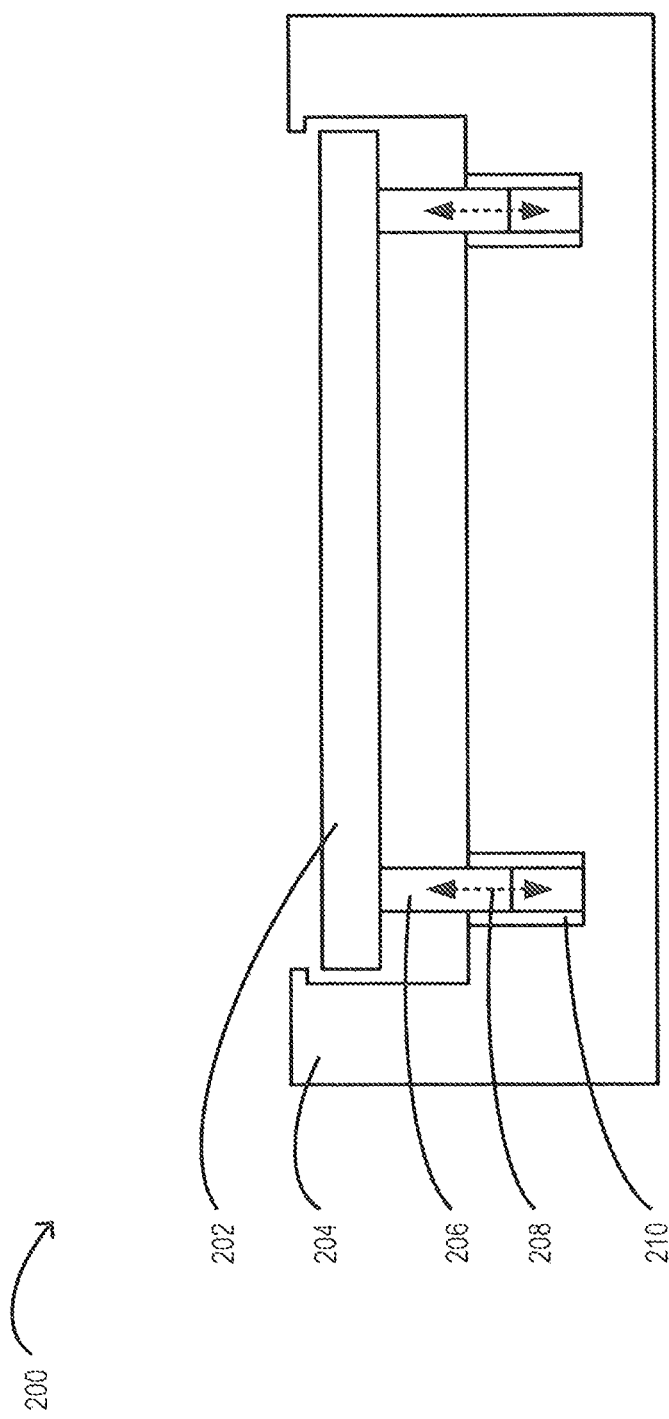
FIG. 4 is a schematic side section view of an example UAV pad, according to one embodiment.

In another aspect, the method, as shown in FIG. 4, may also include: providing at least a first weight-sensitive UAV pad 200 for each of the zones 108, 126 for at least UAV 102 take-offs; and by using at least one computing system: 1) assigning a gross weight limit to each UAV 102 scheduled to take-off from the UAV pad 200, the limit being based on a safety factor and at least one of: a) a characteristic of the UAV 102, b) a characteristic of a power source of the UAV 102, c) a scheduled flight path for the UAV 102, d) and a weather condition; 2) monitoring a weight exerted on the UAV pad 200 when the UAV 102 is positioned on the UAV pad 200; and 3) transmitting a halt-flight signal to the flight management system 150 for the UAV 102 where the weight exceeds the limit.

The location 100 can also include a computer portal or monitor 132 and/or a display 140. The monitor 132 can include an input keyboard and display 136, which can be combined as a touchscreen. It can additionally include a printer 138, for printing various documents. For example, the printer could be used to print a label for adhering to an article to be delivered, with the label bearing a barcode or other machine-readable code. The code can then be scanned or read at various locations, to track delivery of an article. Various electrically powered devices at the location 100, including the monitor 132 can be connected to a conventional electrical supply and/or to a solar panel 134. Where the solar panel is provided, backup battery capacity can be provided.

Reference is now briefly made to FIG. 4. In a particular example, the weight-sensitive UAV pad 200 may comprise a pad body 204 and a level pad 202 slidable up 208 and down 208 relative to the body 204. The body 204 may include at least one weight sensor 210 in communication with at least one of the control panel 116 (FIG. 1) and a processor. The level pad 202 may be sized to accommodate for at least one of a landing and a take-off of the at least one UAV 102.

In yet another aspect, the method may also include providing a first UAV-readable identifier 128 for the first UAV pad 200, the identifier 128 identifying at least one of: a location 100 of the UAV pad 200, and an identity of the UAV pad 200. In yet another aspect, the method may also include providing at least a second UAV pad 200 for at least UAV 102 take-offs, and providing a second UAV-readable identifier 130 for the second UAV pad 200. In some examples, the second identifier 130 may be UAV-distinguishable from the first identifier 128. More than two UAV zones, for landing and taking off, can be provided, as required.

Each identifier optionally can include a logo, trademark or other indicia indicative of an operator of the system. Alternatively or as well, each identifier could include a logo, trademark or other indicia of a person, business or organization associated with or managing a particular location. Thus, if a location is provided at a business or shopping mall, that business or shopping mall may want to incorporate their name, logo, etc. into the identifier 128, 130.

In some examples, at least one of the identifiers 128, 130 may include at least one mark that may be distinguishable, and in some cases readable, by a UAV 102. For example, a UAV 102 may include a sensor operable with a processor to distinguish, and in some cases read, the mark. In a particular example, the mark may include a matrix barcode 128, 130, such as a Quick Response Code™. In a particular example, the UAV 102 may include a video sensor in communication with a processor, and the video sensor may be operable with the processor to capture images of the ground in a vicinity of the UAV 102 and monitor the images for the presence of the mark. Upon detecting the mark, the processor may interpret, for example, particular geometrical features of the mark to generate information pertaining to the mark and UAV zone 108, 126. In some cases, the processor may execute instructions stored on a non-transient memory in order to refine the images using, for example, Reed-Solomon error correction, until the processor can interpret the images. The identifiers 128, 130 may also include beacons that transmit a signal that can be identified by a UAV and used to home in on the desired UAV zone 108, 126.

In another aspect, the method may also include, by using at least one computing system: providing a video feed showing the location 100; and at least when an obstruction in the location 100 is detected, rendering the feed available on at least one channel to be accessed by at least one of: a) an operator of the flight management system 150, and b) an operator of the location 100. The method may further include providing at least one channel for receiving, from at least one of the operators, an override to at least one of the steps of: a) restricting access to the location 100, and b) transmitting an instruction to the flight management system 150 to halt all UAV 102 flights and take-offs to and from the location 100.

In yet another aspect, the method may also include, by using at least one computing system: controlling ground access to the location 100 by requiring a user to enter a ground access code, upon receiving a request from the user for ground access; having the flight management system 150 send the user an access code, that many be sent to a user handheld device; having the user enter the access code at the control panel 116; denying the ground access where the ground access code is incorrect; and granting the ground access when the correct access code is entered.

In examples where the location 100 includes an opening 110 and a gate 112 for the opening being selectively lockable and unlockable via a lock 114, the granting of ground access may include unlocking the lock 114 and denying the ground access may include locking the lock 114.

In yet another aspect, the method may also include providing at least one of an internet connection, a cellular connection, a satellite connection, a private RF connection, a wired connection and a wireless connection for the flight management system 150 to access the at least one channel and communicate with the control panel 116. The flight management system 150 may be operable to control the at least one UAV 102 during at least one of: take-off from and landing to a given embodiment of the location 100, and in transit operation. In some examples, the control panel 116 may be operable with the flight management system 150 to control the at least one UAV 102 during at least one of: take-off from and landing to the location 100. In yet other examples, the control panel 116 may be operable to provide back-up control of the at least one UAV 102 in the case of failure of the flight management system 150.

For example, the control panel 116 may be operable to receive flight management system 150 status updates from the flight management system 150 at pre-programmed intervals. The control panel 116 may be operable to transmit a control-takeover signal to the at least one UAV 102 in response to receiving no (i.e. failing to receive) status updates from the flight management system 150 during a pre-set period of time. In other examples, the control panel 116 may be operable with the flight management system 150 to track the status of the at least one UAV as at least one of: scheduled to land, landing, scheduled to take-off, taking off, and in transit. The control panel 116 may be configured to be capable of sending the control-takeover signal when the status of the at least one UAV is one of: scheduled to land, landing, scheduled to take-off, and taking off.

Additionally, the method may comprise the following steps, at a departure location 100, selected for a requested delivery:

(i) after receiving a request for delivery of an article, at either the control panel 116 or the flight management system 150, generating a departure access code for a location 100 that is a departure location for the requested delivery;

(ii) transmitting the access code to one or more persons associated with the delivery request, who are senders of the article (as part of the delivery request or order, a customer may be asked for contact information for one or more senders at the departure location and one or more receivers at the destination location, for transmission of access codes);

(iii) the access codes may be transmitted wirelessly or otherwise, to each senders portable device such as a smart phone, tablet computer and the like and to the control panel 116 at the departure location;

(iv) a sender with the access code will approach the departure location 100, but will not be permitted access until a UAV selected for the delivery is present at the departure location 100; in some cases a required UAV may already be present and waiting, while in others there will be some delay until a UAV can be sent and arrives from some other location;

(v) once the UAV 102 is present at the departure location 100 (and optionally in the case of a recently arrived UAV, after providing time for rotors to come to rest), the flight management system 150 checks the departure location 100 using available sensors and/or visually checking the location using the surveillance apparatus 120, which may be done either by a computer generated check for unauthorized movement or presence of unauthorized objects, or by an operator examining images of the departure location 100; once it is confirmed that there are no obstructions at the departure location 100, the flight management system 150 will transmit to the control panel 116 a signal permitting the lock 114 to be opened; optionally, a visual indication can be provided by the control panel 116, e.g. on a screen and/or a signal sent to each sender having the access code for the departure location 100 that the location is now available for access;

(vi) a sender can then enter the departure access code, which may be either by way of a keypad at the departure location 100 or by transmitting the access code using suitable short range wireless transmission from a handheld device, such as Bluetooth™, which necessarily will require an individual to be present;

(vii) on receipt of the access code, the control panel 116 will open the lock 114, and the sender can then enter the departure location 100;

(viii) as required, the printer 138 can be used as detailed above to print a label for an article to be delivered and the sender will then attach the label to the article;

(ix) the sender will then approach the UAV and secure the article to the UAV as a payload for delivery; this may comprise the sender opening a compartment in the UAV placing the article in the compartment and closing the compartment, e.g. by an unlatching an latching operation; the UAV will have sensors to detect opening and closing of the article compartment, which will be transmitted to the control panel 116 and to the flight management system 150;

(x) the sender may be required to carry out a series of checks and indicate that each of these has been carried out, e.g. by checking boxes in a list or a screen of the control panel 116 or on a user's handheld device; these checks can include: is area clear; has a visual inspection been completed; is UAV intact and undamaged including check that all rotors are present, secured and with no obvious damage;

(xi) the sender will then exit the departure location, which may require reentering of the departure access code to open the gate 112; optionally if the sender does not exit within a prescribed time period, a communication can be sent to the sender's handheld device to remind him/her to exit;

(xii) as earlier, sensors at the departure location 100 including the video sensor or surveillance apparatus 120 may then be used to confirm that the sender has exited the location 100; the lock 114 will then be closed and will not permit the sender to reopen the lock 114, even if the access code is entered again;

(xiii) the flight management system 150 may then run required pre-flight checks on the UAV 102 including, for example, checking the weight of the UAV with the article, checking on the available battery life for the UAV, and a final check on weather along the route for the delivery; and (xiv) if the checks are all clear, the UAV will then be instructed by the flight management system 150 to commence the delivery; at this time, optionally, a communication can be sent to all parties involved in the delivery (again as detailed by the person requesting delivery) that the delivery has commenced, which will usually include a sender at the departure location and a receiver at the destination location, and this may include an anticipated arrival time.

Correspondingly, at a destination location 100 (it will be understood that the departure and destination locations will be separate, but the same reference numeral is used for both, as both of them will have similar elements as shown in the Figures and as described), the method can include the flight management system generating a destination access code that will be transmitted to the person requesting the delivery, and which may be the same as or different from the departure access code. The method at the destination location can include the following additional steps:

(i) as detailed elsewhere, the UAV 102 will be permitted to land at the location, once it is confirmed that the closure 112 is closed and locked and that there are no obstructions present; as for the departure sequence, a receiver may be required to enter the location and to perform and to confirm visual checks;

(ii) as for the departure sequence, a destination access code will be sent to each receiver that has been identified to the flight management system 150 and to the control panel 116 at the destination location;

(iii) after the UAV 102 has landed at the destination location 100 and, optionally, after allowing a suitable period of time for the rotors of the UAV to come to rest, the control panel 116 and/or the flight management system 150 will send a signal to the lock 114, to permit it to be opened by the destination access code;

(iv) the receiver will then enter the destination access code at the destination location 100; as for the departure location, this may be done either by entering the access code on a local keypad, or by way of short range wireless communication, e.g. Bluetooth™, from a handheld device or the like;

(v) with the destination access code entered, the lock 114 is opened, and the receiver may open the gate or closure 112, to gain access to the destination location 100;

(vi) optionally, to ensure all necessary actions are completed, the lock 114 may then be closed, and may only be opened once the receiver has completed required actions to retrieve an article etc.; this option may include the provision of an emergency release of the lock 114, in case of some failure or breakdown that prevents a receiver from completing the required actions;

(vii) the receiver will then approach the UAV 102, open a compartment for the article, e.g. by releasing a latch, or otherwise detach the article from the UAV 102, and where necessary close a compartment;

(viii) the receiver may then send a signal, e.g. by reentering the access code, or entering a different code provided, to the control panel 116 which will communicate with the flight management system 150, to indicate that the article has been retrieved;

(ix) the flight management system 150 will then check that the article has been retrieved, by confirming that the measured weight of the UAV, as measured by the UAV pad 200, has been reduced by the weight of the article, and will also confirm that any required actions such as relatching or closing a compartment have been completed;

(x) once the flight management system 150 has confirmed these actions, i.e. retrieval of the article and closure of a compartment on the UAV, the lock 114 is then again released;

(xi) the receiver can then reenter the local destination access code, to open the lock 114, so the receiver may exit the departure location 100 bearing the article; when the receiver closes the closure or gate 112, the lock 114 secures the closure 112; at this time, the receiver's destination access code may then be rendered inoperative, to prevent any reentry by the receiver into the location 100, and optionally, this may only be after the receiver has sent a communication to the flight management system 150 confirming that receipt of the article is complete and/or after a predetermined period of time after the receiver has exited the destination location.

Figure 2:
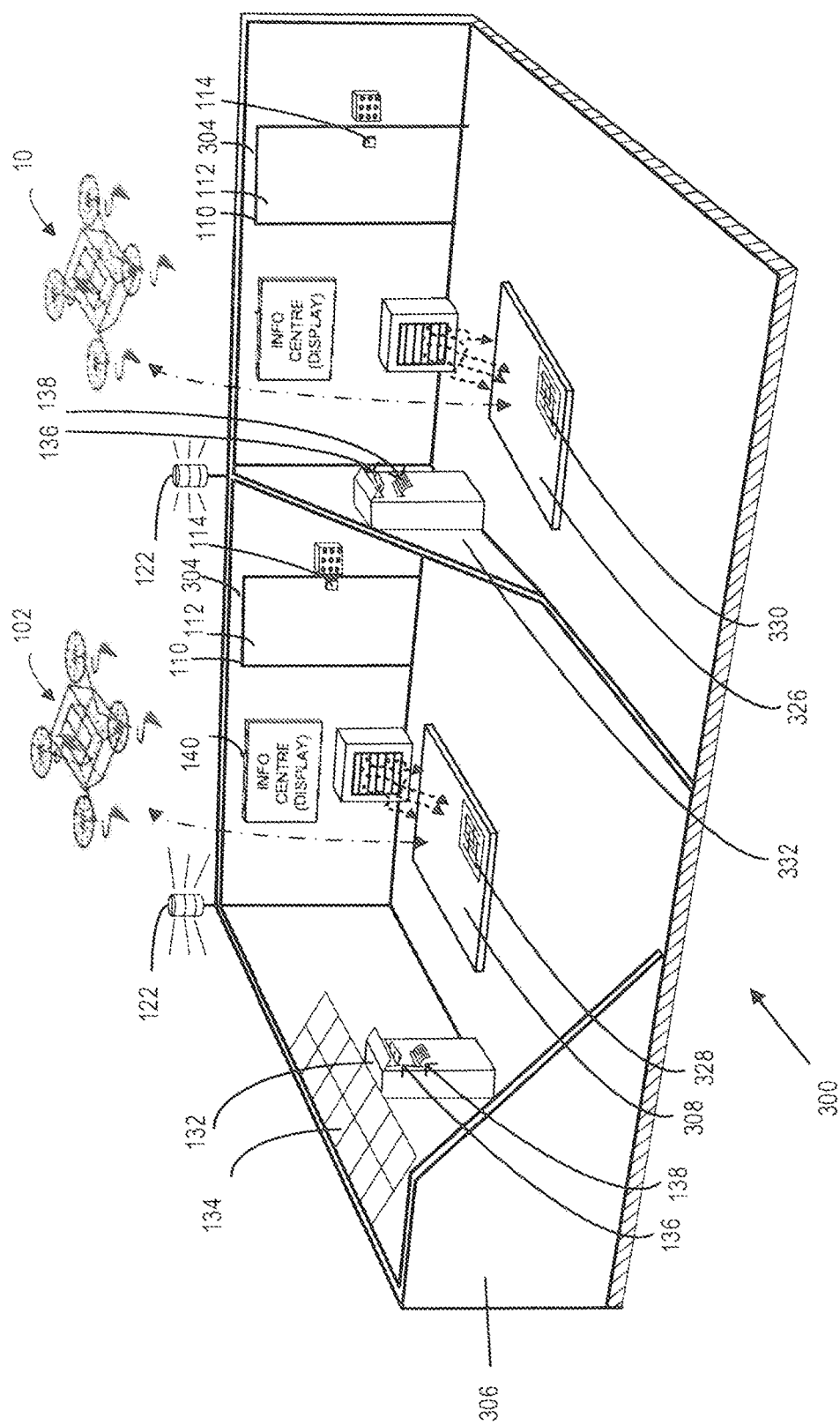
FIGS. 2 and 3 are schematic examples of other embodiments of a location for UAV landing and taking off.
Figure 3:
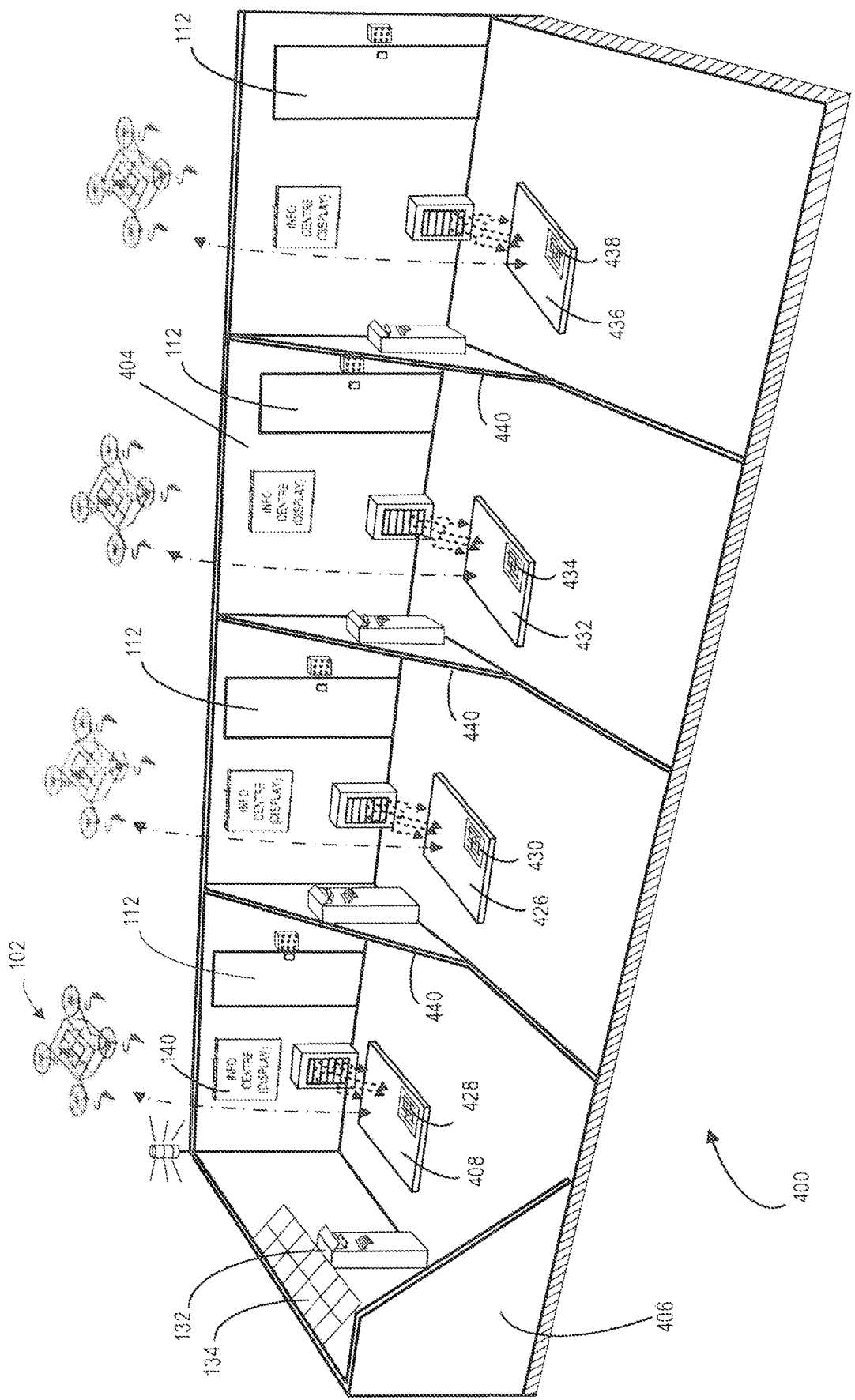

Reference will now be made to FIGS. 2 and 3 which show alternative locations that include, respectively, two and four individual and separate zones. For simplicity and brevity, like components in FIGS. 2 and 3 are given the same reference numeral as in FIG. 1, and it will be understood that in general the individual components of the location shown in FIG. 1 will be duplicated for each of the zones shown in FIGS. 2 and 3.

Thus, in FIG. 2, a location 300 has an enclosure 306 with a barrier 304, which includes an additional dividing wall 332. This provides for a first zone 308 with an identifier 328 for landing and taking off, and a second zone 326 with an identifier 330 for landing and taking off, each of which can be accessed separately through a respective closure or gate 112, to ensure that, for each zone, only authorized personnel are given access.

Similarly in FIG. 3, a barrier 404 is divided by walls 440 into four separate zones 408, 426, 432 and 436, with respective identifiers 428, 430, 434 and 438. Each zone is provided with its own access closure or gate 112. (It will be understood that in order to show details of each zone, in FIGS. 1, 2 and 3, barrier and dividing walls are shown cutaway.)

A controlled access UAV zone or location as disclosed can be provided at a variety of different places. For example, a drone delivery service operator may provide a UAV parking zone or location at customers' premise, for each customer who regularly uses the drone delivery service. The customers could be, for example, manufacturers, shippers, distributors or other businesses. The controlled access UAV zone or location may also be provided at any suitable public location or building. E.g., in smaller communities, it could be provided at a school, hospital, town hall, public library, court house, shopping mall, etc., and may be a building or facility that is government owned and operated or one that is privately owned and operated, such as a shopping mall. A controlled access UAV location may also be provided at a multi-tenanted building, such as a condominium. For any building, including mid to high rise multi-occupant buildings, it may be preferable to place the UAV location on the roof or other high point of the building.

In another aspect, a UAV parking zone or location could be provided for use by several customers of drone delivery service. For example, a common UAV parking zone or location can be provided at an industrial mall, where there are a number of businesses. In such a case, each business may be provided with an access code.

In some embodiments and depending on the UAV parking zone or location and the businesses, a common access code for accessing the UAV parking zone or location may be provided to the businesses. In other embodiments, each business may be provided with a dedicated access code. Dedicated access codes may provide for, for example, tracking access to the UAV parking zone or location, and setting up varying permission levels. The permission levels may include, for example, for each dedicated access code one or more time slots during which the access code may provide access to a given UAV parking zone or location. Each individual access code may be made active, only when a UAV is arriving or leaving with a delivery for that business.

In yet another aspect, a pay structure may be assigned to dedicated access codes. Alternatively or as well, the pay structure could vary depending on time, e.g. time slots outside of regular business hours could be less expensive than time slots in regular business hours. In some examples, one or more permission levels may be assigned to a given dedicated access code depending on the terms of an agreement under which the code may be licensed or leased to a customer. In a particular example, a customer access system may be provided using at least one computing system. The access system may be operable to provide a pay structure for dedicated access codes. For example, a year may be broken down into weeks, days, and possibly hours.

The resulting time slots, days, and weeks may each be associated, either individually or in groups, with varying levels of demand for a drone delivery service at a given UAV parking zone or location. Accordingly, the system may be operable to sell, lease, or rent out dedicated access codes depending on the access or permission level(s) requested by a customer for each of the access codes.

For example, the customer access system may be operable to assign to a given dedicated access code permissions for that code to provide access to a given UAV parking zone or location on Mondays, Wednesdays, and Fridays, and may be operable to assign a given sale, lease, or rent rate or value (for example, expressed in dollars) to that code, or type of code. The system may be further operable to assign different permissions and lease, or rent rate or value to different dedicated access codes or types or classes of dedicated access codes.

In a further aspect, the customer access system may be operable to assign different one or more limits for at least one of UAV landings and take-offs, and corresponding pricing, for different dedicated access codes, dedicated access code types, or dedicated access code classes. In a given example, the customer access system may be operable to sell dedicated access codes on at least one of a per-UAV-landing and a per-UAV-take-off basis. That is, the system may assign a given price for each UAV landing and each UAV take-off, and may also provide discounts where, for example, a minimum number or numbers of landings and take-offs are purchased by a customer.

In yet a further aspect, the system may assign a dedicated access code to a given customer, and may be operable to request "re-fills" of landings and take-offs when the customer uses all pre-purchased landings and take-offs at the UAV parking zone or location to which that code may be assigned. In another aspect, the system may be operable to track the number of landings and take-offs used by each customer and may be operable to bill each customer based on the number and based on, for example, a payment method chosen by each customer. In one example, a customer may provide at least one of a credit card and a debit card and authorization to charge the card(s) on, for example, a weekly or a monthly basis.

Other aspects are described next. In one aspect, if one of the businesses at the example industrial mall, a customer of the drone delivery service, is either sending an article or expecting delivery of an article by the drone delivery service, only that customer's access code may permit access to the UAV zone or location while this delivery operation is taking place.

For a package to be sent from the UAV zone or location, access to the location may be restricted to that customer, until the UAV has picked up the article and departed from the UAV zone or location. At that time, the UAV zone or location may be released for use by another customer. Similarly, while the UAV is delivering an article to one customer, access may be restricted to that one customer, until at least the customer has accessed the UAV zone or location and retrieved the delivered article.

A UAV zone or location as disclosed can be provided in a variety of different places. It can be provided simply on any suitable flat, unobstructed piece of ground. Alternatively, and for an example in a more crowded or industrial setting, the UAV zone or location may be provided on top of a building with a flat roof, or a building on which a large enough flat landing and take-off area can be constructed. An advantage of providing a UAV zone or location on top of a building may be that it may reduce the requirement for a UAV to fly down between obstructions such as poles, power cables, other buildings, and the like and may reduce the possibility for accidents.

In addition to locations identified above, a UAV location as disclosed can be provided at warehouses, distribution centers, cross-docking facilities, order fulfillment facilities, packaging facilities, shipping facilities, rental facilities, libraries, retail stores, wholesale stores, museums, or other facilities or combinations thereof.

While the UAV shown is a multirotor helicopter, a UAV location can be configured for any type of UAV, including multirotor helicopters, such as a quadcopter or a fixed wing craft. For example, the UAV may include a combination of both propellers and fixed wings. For example, the UAV may utilize one or more propellers to enable take-off and landing and a fixed wing configuration or a combination wing and propeller configuration to sustain flight while the UAV is airborne. A UAV location for UAVs not adapted for vertical landing and take-off will be configured to provide suitable flight paths for landing and take-off.

A UAV for use with the UAV location disclosed can include any instrumentation suitable for assisting in the control of the UAV, including a time of flight sensor or calculator, radar, sonar, a camera, an infrared sensor, one or more displays, image capture devices, thermal sensors, accelerometers, pressure sensors, weather sensors, LIDAR, sensors for detecting hazardous materials, etc.

Further, while the invention has been described for use with aerial vehicles, it may be applied to land vehicles, such as robots or autonomously guided vehicles as cars, the travel along road systems.

The apparatuses, systems, functions, and methods described in this document may be implemented using any combination of suitable known technology, materials, and manufacturing, assembly, and programming methods.

A number of embodiments have been described herein. However, it will be understood by persons skilled in the art that other variants and modifications may be made without departing from the scope of the embodiments as defined in the claims appended hereto. A person skilled in the art will also recognize that the embodiments described above should be read as representative of a plethora of permutations not explicitly described, the permutations incorporating elements from various embodiments.

We claim:

1. A UAV location management method for use with a flight management system, the method comprising:
   providing a secure access unmanned aerial vehicle (UAV) location;
   providing a cleaner for the location; and
   monitoring for an obstruction in the UAV location;
   when an obstruction is present in the UAV location:
   (i) restricting access to the UAV location;
   (ii) transmitting an instruction to the flight management system to halt UAV flights and take-offs to and from the UAV location; and (iii) transmitting an instruction to the cleaner to clear the obstruction from the UAV location.

2. The method as claimed in claim 1, including: determining that the obstruction is one of:
   a) at least one animate object,
   b) at least one inanimate object, and
   c) at least one animate object in combination with at least one inanimate object; and
   when the obstruction is determined to be at least one inanimate object, performing at least one of the steps (i) to (iii).

3. The method of claim 1, further comprising providing the secure access unmanned aerial vehicle (UAV) location with a first UAV pad having a first UAV-readable identifier, providing at least a second UAV pad for at least UAV take-offs, and providing a second UAV-readable identifier for the second UAV pad, the second UAV-readable identifier being distinguishable by a UAV from the first UAV-readable identifier.

4. The method of claim 2, further comprising, by using at least one computing system:
   controlling ground access to the UAV location by requesting entry of a ground access code upon receiving a request for the ground access to the location;
   receiving a reference code from the flight management system;
   comparing the ground access code with the reference code;
   denying the ground access where the ground access code does not match the reference code; and
   granting the ground access where the ground access code matches the reference code.

5. The method of claim 2, further comprising providing at least one of a land line, an internet connection, a cellular connection, a wifi connection and a satellite connection for the flight management system to access the at least one channel.

6. A method of controlling access to a location for unmanned aerial vehicles (UAVs) comprising one or more of the following steps, at a departure location selected for a requested delivery:
   (i) after receiving a request for delivery of an article, generating a departure access code for the departure location;
   (ii) transmitting the access code to one or more persons associated with the delivery request, to each sender's portable device;
   (iii) each sender with the access code approaching the departure location and will be permitted access when a UAV selected for the delivery is present at the departure location;
   (iv) once the UAV is present at the departure location, checking with the flight management system available sensors and/or visually checking the location using a surveillance apparatus, for unauthorized movement or presence of unauthorized objects;
   (v) once it is confirmed that there are no obstructions at the departure location, transmitting to a control panel signal to open a lock, to permit access to the departure location;
   (vi) entering by the sender the departure access code, which may be either by way of a keypad at the departure location or by transmitting the access code using suitable short range wireless transmission from a handheld device;
   (vii) on receipt of the access code, opening the lock, to permit the sender to enter the departure location;
   (viii) having the sender secure an article to the UAV as a payload for delivery and then exit the departure location; and
   (ix) causing the UAV to take-off to deliver the article secured to the UAV to a destination location.

7. The method of claim 6, including, after step (viii): having the sender carry out a series of checks, including checking for obstructions and that the UAV is undamaged, and indicate that each of these has been carried out, optionally by checking boxes in a list or a screen of the control panel or on a user's handheld device.

8. The method of claim 6, including using sensors at the departure location, including video sensor or surveillance apparatus, to confirm that the sender has exited the location, and once confirmed closing the lock to prevent reentry.

9. The method of claim 6, including having the flight management system run pre-flight checks on the UAV including, for example, checking the weight of the UAV with the article, checking on the available battery life for the UAV, and a final check on weather along the route for the delivery.

10. The method of claim 6, including when the delivery is commenced sending a communication to parties involved in the delivery which optionally includes the sender at the departure location and a receiver at the destination location.

11. A method of receiving a delivery by an unmanned aerial vehicle (UAV) at destination location, comprising one or more of the following steps:
   (i) permitting the UAV to land at the destination location, once it is confirmed that a closure for that location is closed and locked by a lock and that there are no obstructions present;
   (ii) sending a destination access code at least to each receiver that has been identified to a control panel at the destination location;
   (iii) after the UAV has landed at the destination location, sending a signal to the lock, so as to permit the lock to be opened by the destination access code;
   (iv) having the receiver enter the destination access code at the destination location;
   (v) with the destination access code entered, opening the lock, so the receiver may open the closure, to gain access to the destination location;
   (vi) having the receiver approach the UAV and retrieve an article from the UAV;
   (vii) having the receiver leave the destination location with the article; and
   (viii) as required, causing the UAV to depart from the destination location, with or without another article.

12. The method of claim 11, including, to ensure all necessary actions are completed, maintaining the lock closed while the article is being retrieved, and only opening the lock once the receiver has completed required actions to retrieve the article, which optionally includes checking that the article has been retrieved, by confirming that the measured weight of the UAV has been reduced by the weight of the article.

13. The method as claimed in claim 6, wherein the access code is transmitted wirelessly.

* * * * *